Dec. 24, 1957  W. R. TAGGERT  2,817,536
COMBINED RUNNER AND MUDGUARD ATTACHMENT FOR A VEHICLE
Filed Oct. 14, 1955
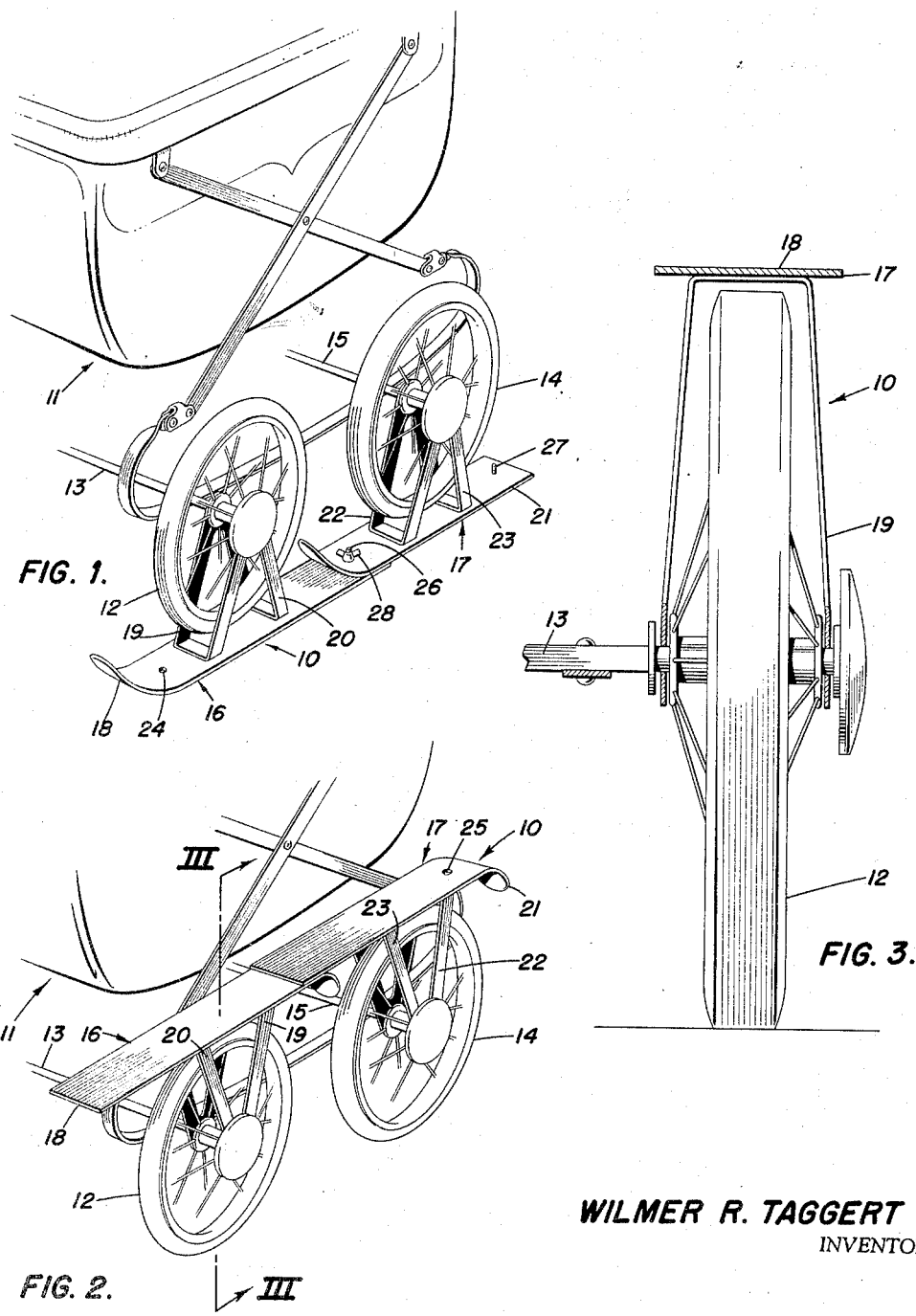
WILMER R. TAGGERT
INVENTOR
BY Norman S. Blodgett
ATTORNEY

United States Patent Office 2,817,536
Patented Dec. 24, 1957

2,817,536

COMBINED RUNNER AND MUDGUARD ATTACHMENT FOR A VEHICLE

Wilmer R. Taggert, Worcester, Mass., assignor of one-half to Norman S. Blodgett, Westboro, Mass.

Application October 14, 1955, Serial No. 540,436

4 Claims. (Cl. 280—11)

This invention relates to an attachment for a vehicle and more particularly to apparatus for use on a baby carriage or the like.

In the past many devices have been evolved to permit the transformation of a four-wheeled vehicle, such as a baby carriage, into a sleigh for use on ice and snow. In some cases, the runners of the devices have been adapted to be used alternatively as mud guards. None of these previously-known devices have achieved any degree of commercial success, because they proved to be expensive to manufacture and complicated to use. In most cases the basic construction has been such as to render these devices rather fragile. These and other difficulties of the prior art are obviated by the present invention in a novel manner.

It is therefore an outstanding object of the invention to provide an attachment for a four-wheeled vehicle, such as a baby carriage, which attachment is inexpensive to manufacture and relatively simple to use.

Another object of this invention is the provision of a rugged attachment for a baby carriage or the like which may be used alternatively as a sleigh runner or a mud guard.

It is a still further object of the instant invention to provide an attachment of the type described which is light in weight, which lends itself to beauty of design, and which will not interfere with the normal operation of the vehicle to which it is attached.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Figure 1 is a perspective view of the invention shown in use with a baby carriage, Figure 2 is a perspective view of the invention showing an alternative use, and Figure 3 is a sectional view of the invention taken on the line III—III of Figure 2.

Referring first to Figure 1, wherein is best shown the general features of the invention, the attachment, indicated generally by the reference numeral 10, is shown in use with a baby carriage 11 of the usual type. On one side the carriage has a front wheel 12 mounted on an axle 13 and a rear wheel 14 mounted on an axle 15. The attachment 10 consists of a front portion 16 and a rear portion 17, the two portions being exactly identical in construction. The front portion 16 consists of a runner 18, a front brace 19, and a rear brace 20. The runner is formed of sheet metal, preferably of aluminum, since this metal is both light in weight and rust-proof. The runner has its front end rounded and bent upwardly. The rear portion 17 consists of a runner 21, a front brace 22 and a rear brace 23. The runner 18 is provided with an aperture 24 at its forward end and the runner 21 is provided with a similar aperture 25. A threaded stud 26 extends from the upper rear surface of the runner 18, while a similar stud 27 is provided on the runner 21. A wing nut 28 is provided which may be threaded alternatively on the studs 26 and 27. Each of the braces 19, 20, 22 and 23 is formed of sheet metal and has a bight and two legs defining U-shaped configuration; the bight of each brace is fastened by welding or the like to the surface of its runner. The braces are fastened to the skis in such a manner that the center of each runner is situated midway between its two braces. The outer end of each of the legs of each of the braces is formed with an aperture to receive a baby-carriage axle. As is clear in the drawings, the elements are selected of such a size that there is very little space between the runners and their respective wheels.

The operation of the invention will now be clearly understood in view of the above description. The front portion 16 is mounted on the front wheel 12 of the carriage 11. This is done by removing the wheel from its axle 13, placing the wheel between the legs of the braces 19 and 20 with the wheel aperture aligned with the apertures in the legs, and impaling the assemblage on the axle. The usual means, such as a cotter pin and hub cap, is used to maintain the wheel and the front portion of the attachment in place on the axle. The rear portion 17 is similarly mounted on the axle 15 along with the rear wheel 14. When the front and rear portions are so mounted, they are free to be rotated about their respective axles independently of the wheels. If snow and ice is on the ground and it is desired to make a sleigh of the baby carriage, the portions are rotated so that they underlie their respective wheels, as shown in Figure 1. In this position the stud 26 of the runner 18 will extend upwardly through the aperture 25 in the runner 21 and the wing nut 28 will be threaded on the stud 26 to hold the runners together. It will be understood that an attachment of the kind described will be used on each side of the baby carriage, so that the assembly acts as a sleigh.

When, alternatively, it is desired to use the carriage in the manner for which it was intended, i. e., resting on its wheels, the front and rear portions 16 and 17 are rotated to positions overlying the wheels, as shown in Figure 2. The straight end of the runner 21 of the rear portion 17 rests on the curved end of the runner 18 of the forward portion. The stud 27 of the runner 21 extends downwardly through the aperture 24 of the runner 18 and the wing nut 28 is threaded on the stud to hold the two portions in rigid assembly. When the attachment is used thusly, the bent ends of the runners extend downwardly along the rearward surfaces of the wheels and an excellent mud-guard is formed.

It should be noted that the width of the runners should be considerably more than the thickness of the wheels of the carriage. There are several reasons for this, not the least of which is that such width is necessary to lend mechanical strength to the runners, which are preferably formed of a light-weight sheet metal, such as aluminum. When the attachment is used in the manner shown in Figure 1, this width provides smooth gliding over snow and, because of the distribution of the carriage weight, will prevent the runners from cutting through the snow to the ground. When the invention is used as indicated in Figures 2 and 3, the width enables it to act more effectively as a mud guard.

While it will be apparent that the illustrated embodiments of the invention herein disclosed are well calculated to fulfill adequately the objects and advantages primarily stated, it is to be understood that the invention is susceptible to variation, modification and change within the spirit and scope of the subjoined claims.

The invention having been thus described, what is claimed as new and desired to be secured by Letters Patent is:

1. An attachment for a four-wheeled vehicle comprising a front portion adapted to be attached to the front wheel on one side of the vehicle for pivotal movement about the axle thereof, a rear portion adapted to be attached to the rear wheel on the same side of the vehicle for pivotal movement about the axle thereof, converging U-shaped braces connecting each of the above portions to its respective axle, the bight of each brace being attached to the respective portion with the free end of the legs of the converging braces overlapping and being pivotally connected to the axle, each of the said portions having a runner with a turned-up end, the runners being formed of light-weight sheet metal, the runners being long enough to overlap one another when they are in an aligned position, a first fastening means for holding the overlapped portions of the runners together as a unitary sleigh assembly when they are in aligned position underlying the wheels, and another fastening means for holding the overlapped portions of the runners together as a unitary mudguard assembly when the runners are in aligned position overlying the wheels, each fastening means consisting of a stud extending from the surface of a runner at the end which is not turned-up and extending in the same direction as the turned-up end, an aperture in the other runner adjacent the turned-up end, and a nut for cooperation with the stud.

2. An attachment for a four-wheeled vehicle comprising a front portion adapted to be attached to the front wheel on one side of the vehicle for pivotal movement about the axle thereof, a rear portion adapted to be attached to the rear wheel on the same side of the vehicle for pivotal movement about the axle thereof, each of the said portions having a runner with a turned-up end, each portion further having two U-shaped braces, each brace having a bight which is fastened to the runner and having legs with apertures at their outer ends to fit over the axle, the runners being long enough to overlap one another when they are in an aligned position, a first fastening means for holding the overlapped portions of the runners together as a unitary sleigh assembly when they are in aligned position underlying the wheels, and another fastening means for holding the overlapped portions of the runners together as a unitary mudguard assembly when the runners are in aligned position overlying the wheels.

3. An attachment for a four-wheeled vehicle comprising a front portion adapted to be attached to the front wheel on one side of the vehicle for pivotal movement about the axle thereof, a rear portion adapted to be attached to the rear wheel on the same side of the vehicle for pivotal movement about the axle thereof, each of the said portions having a runner, the end of the runner which is directed forwardly when the runner underlies the wheel being turned upwardly, the runners being formed of sheet aluminum, each of the said portions further having two U-shaped braces, each brace having a bight which is fastened to the runner and having legs with apertures at their outer ends to fit over the axles, the braces on a given portion extending at such angles to the runner that the apertures at the outer ends of the legs are aligned, the runners being long enough to overlap one another when they are in an aligned position, a first fastening means for holding the overlapped portions of the runners together as a unitary sleigh assembly when they are in aligned position underlying the wheels, and another fastening means for holding the overlapped portions of the runners together as a unitary mudguard assembly when the runners are in aligned position overlying the wheels.

4. An attachment for a four-wheeled vehicle comprising a front portion adapted to be attached to the front wheel on one side of the vehicle for pivotal movement about the axle thereof, a rear portion adapted to be attached to the rear wheel on the same side of the vehicle for pivotal movement about the axle thereof, each of the said portions having a runner, the end of the runner which is directed forwardly when the runner underlies the wheel being turned upwardly, the runners being formed of sheet aluminum, each of the said portions further having two U-shaped braces, each brace having a bight which is fastened to the runner and having legs with apertures at their outer ends to fit over the axles, the braces on a given portion extending at such angles to the runner that the apertures at the outer ends of the legs are aligned, the runners being long enough to overlap one another when they are in an aligned position, a first fastening means for holding the overlapped portions of the runners together as a unitary sleigh assembly when they are in aligned position underlying the wheels, and another fastening means for holding the overlapped portions of the runners together as a unitary mudguard assembly when the runners are in aligned position overlying the wheels, each fastening means consisting of a stud extending from the surface of a runner at one end and extending in the same general direction as the braces, an aperture in the other runner, and a nut for cooperation with the stud.

References Cited in the file of this patent

UNITED STATES PATENTS

| | | |
|---|---|---|
| 395,398 | Lewis | Jan. 1, 1889 |
| 1,291,229 | Stevenor | Jan. 14, 1919 |
| 1,745,643 | Roessel | Feb. 4, 1930 |
| 2,443,699 | Swain | June 22, 1948 |
| 2,539,686 | Ballentine | Jan. 30, 1951 |